United States Patent Office
3,556,585
Patented Jan. 19, 1971

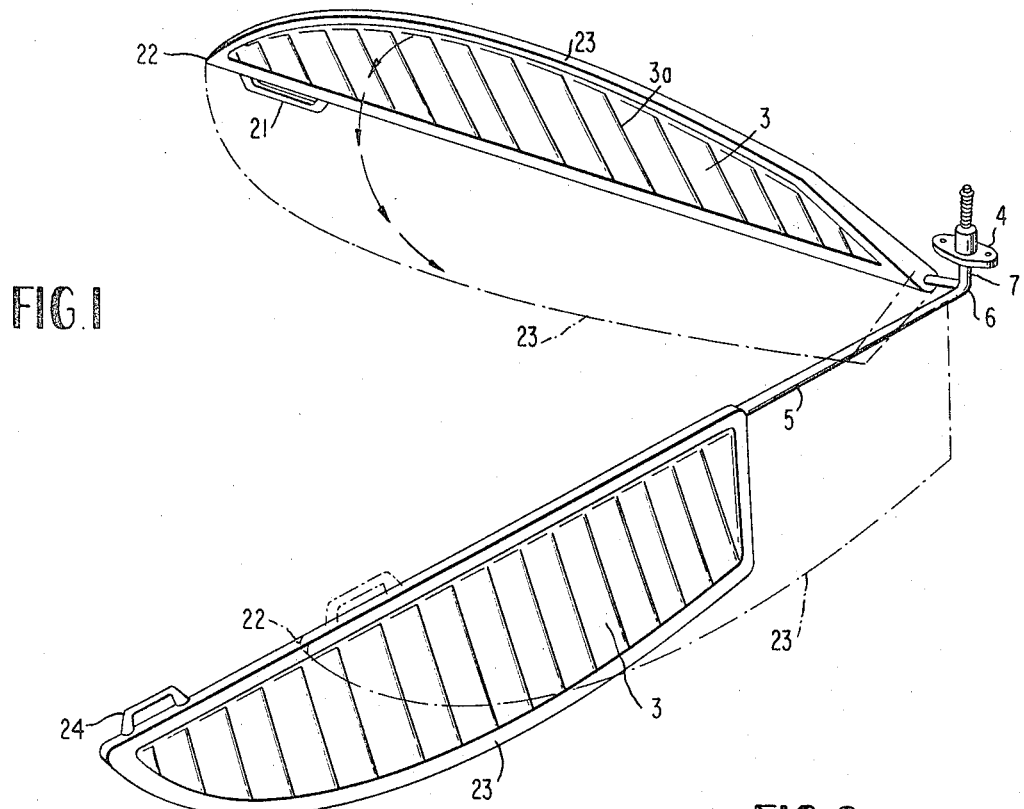
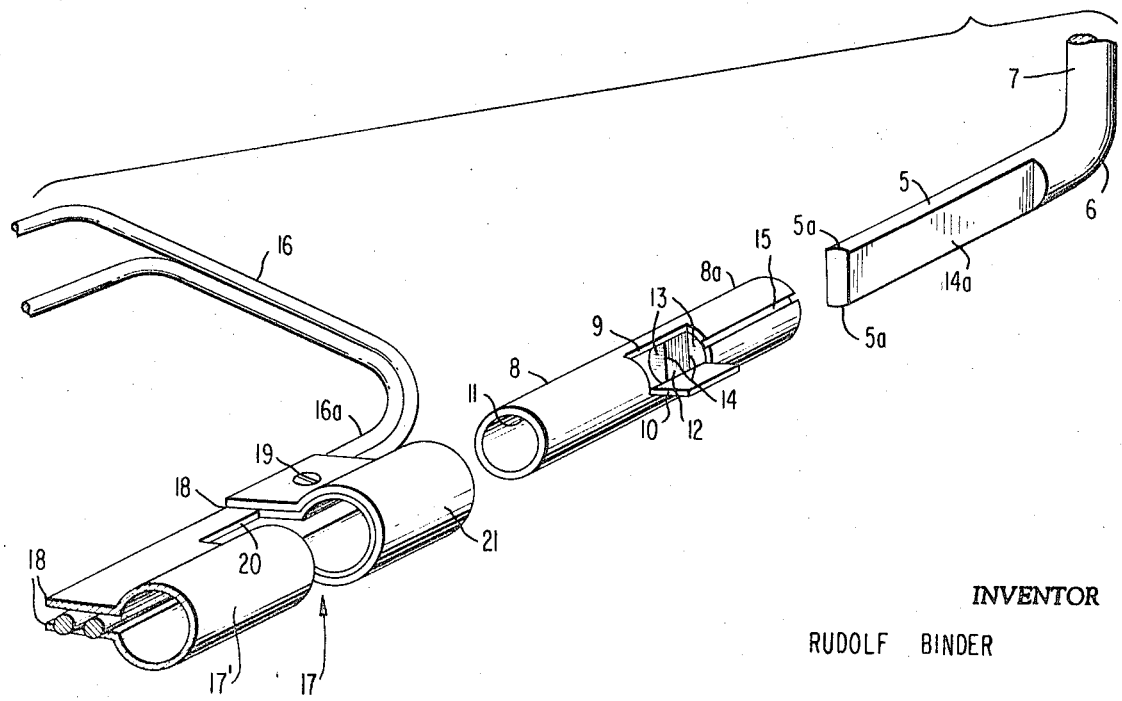

3,556,585
SUN VISOR, ESPECIALLY AT THE WINDSHIELD OF MOTOR VEHICLES
Rudolf Binder, Schonaich, Wurttemberg, Germany, assignor to Daimler-Benz Aktiengesellschaft, Stuttgart-Unterturkheim, Germany
Filed Aug. 23, 1968, Ser. No. 754,913
Claims priority, application Germany, Aug. 25, 1967, 1,630,343
Int. Cl. B60j 3/02
U.S. Cl. 296—97                                        6 Claims

ABSTRACT OF THE DISCLOSURE

A sun visor, especially for the windshield of motor vehicles whose sun visor plate can be pivoted about an essentially horizontal support rod and can also be axially displaced on the support rod in such a manner that it is automatically held fast in every desired position.

---

The present invention relates to a sun visor, especially at the windshield of motor vehicles, whose sun visor plate is pivotally arranged on an essentially horizontally extending support rod which, in its turn, is pivotal at one end about an approximately vertical axis.

Sun visors of the aforementioned type are known in the prior art. They entail the disadvantage that the area of the windshield and/or of the side windows to be shielded or covered thereby is not sufficiently large. Above all, with the known prior art sun visors, the sun visor plate is tied always to the area of the pivot axis of its support rod, and consequently it cannot be displaced at the windshield sufficiently far toward the vehicle center or at the side window sufficiently far toward the rear.

The present invention aims at eliminating the aforementioned disadvantages. It solves the underlying problem with the sun visors of the aforementioned type in that the sun visor plate is simultaneously displaceable on its support rod in the axial direction. The arrangement is thereby made in such a manner that the sun visor plate is adapted to be automatically fixed on the support rod in every desired axial position by clamping action.

The sun visor constructed in accordance with the present invention offers a much larger adjusting range. Both the driver and the passenger seated alongside the driver can protect themselves considerably better against incident sun rays or other light influences. Also, the areas at the windshield which could not be shielded or covered off heretofore with a sun visor plate, can now be reached with the sun visor plate of the present invention.

In one preferred type of construction according to the present invention, at least one non-rotatably guided support sleeve is arranged axially displaceable for the purpose of mounting the sun visor plate on the support rod which support sleeve receives the sun visor plate by means of a clamping ring. Appropriately, the support sleeve is thereby constructed as a tubular element. The tubular element is surrounded according to the present invention by the clamping ring which, in its turn, is secured at the sun visor plate.

According to a further feature of the present invention, the support sleeve is provided approximately in its center with a projecting lug or fold for the engagement into a corresponding aperture at the clamping sleeve. This lug or fold is appropriately bent out of the tubular element forming the support sleeve, whereby an aperture remains in the tubular element. Furthermore, the support rod is flattened off on two sides, and segmental bodies are secured in the support sleeve which correspond to these flattened-off portions. In this matter, the support sleeve is non-rotatably guided on the support rod.

A further inventive feature essentially resides in that the support sleeve is provided with a longitudinal slot within the area in which the segmental bodies are arranged. The abutment of the segmental bodies against the flattened-off surfaces of the support rod can be adjusted thereby. The slot in the support sleeve appropriately extends into the aperture resulting from the bending out of the lug.

The present invention further proposes that the clamping ring is provided with an additional clamp adapted to be tightened by means of an adjusting screw adjacent the aperture and more particularly on the side corresponding to the slotted portion of the support sleeve. In this manner, by tightening the adjusting screw, both the prestress of the clamping ring with respect to the support sleeve as well as also the prestress of the support sleeve with respect to the support rod can be adjusted. It is achieved thereby that the sun visor plate stays automatically fixed at every desired position by reason of the clamping action irrespective of whether it involves the pivotal movement of the clamping ring about the support sleeve or the longitudinal displacement of the support sleeve on the support rod.

Accordingly, it is an object of the present invention to provide a sun visor for motor vehicles which avoids by simple means the aforementioned shortcomings and drawbacks encountered in the prior art.

Another object of the present invention resides in a sun visor, especially at the windshield of motor vehicles, which effectively increases the useful area of such sun visor.

A further object of the present invention resides in a sun visor of the type described above which is capable of protecting the driver and passenger of the motor vehicle against incident sun rays or other light influences to a considerably greater extent than has been possible heretofore.

Still another object of the present invention resides in a sun visor for motor vehicles which can be used to cover off certain areas of the windshield and side windows that could not be protected heretofore from incident light or sun rays.

These and further objects, features, and advantages of the present invention will become more obvious from the following description when taken in connection with the accompanying drawing which shows, for purposes of illustration only, one embodiment in accordance with the present invention, and wherein:

FIG. 1 is a perspective view of a sun visor in accordance with the present invention, for the passenger space alongside the driver illustrating the different positions thereof; and FIG. 2 is a perspective exploded view of a pivotal and displacement bearing support of the sun visor plate on the support rod in accordance with the present invention.

Referring now to the drawing wherein like reference numerals are used throughout the two views to designate like parts, and more particularly to FIG. 1, the sun visor, illustrated in this figure is disposed with its sun visor plate or flap 3 in the usual pivoted-up position above the windshield of a motor vehicle. From this position, the sun visor plate 3 can be—as indicated in dash and dot lines—pivoted down if disturbing light is incident from in front. The sun visor plate 3 is arranged on a support rod 6 which is pivotal in a support base 4 about an approximately vertical axis. The sun visor plate 3 can also be pivoted about this axis—as can be seen from the lower part of FIG. 1—toward the side window.

The support rod 6 is pivotally supported in the support base 4 in a conventional manner as described by means of a relatively short arm 7. Its longer arm 5 receives and carries the sun visor plate 3. The sun visor plate 3 is displaceable in the longitudinal direction on the arm 5 of the support rod 6 as can be seen from the lower full-line position in FIG. 1.

According to FIG. 2, the longer arm 5 of the support rod 6 is provided with flattened-off portions 14a. In this manner one obtains in cross section an approximately upright rectangle whose smaller sides 5a extend with a slight curvature.

One or several support leaves 8 are placed over this longer arm 5 of the support rod 6; the support sleeve or sleeves 8, in their turn, carry the sun visor plate 3 by means of clamps generally designated by reference numeral 17. A tubular section preferably serves as support sleeve 8; two segmental bodies 13 are appropriately secured at one end in the interior aperture 11 of the support sleeve 8. The inner surfaces 14 of these segmental bodies 13 abut against the flattened surfaces 14a of the arm 5. In this manner, the support sleeve 8 is non-rotatably secured with respect to the support rod 6. However, the support sleeve 8 can be displaced in the longitudinal direction on the support rod 6.

In the section 8a of the support sleeve, i.e., in the portion in which are also arranged the segmental bodies 13, is provided a longitudinal slot 15. In this manner, the support sleeve 8 can be retightened within this area so that the clamping effect can be adjusted with respect to the support rod 6. Approximately in the center of the support sleeve 8 a lug or fold 10 is bent out whereby a window-like aperture 9 results. The slot 15 runs out in this aperture 9.

The lug 10 at the support sleeve 8 engages in an aperture 20 of the clamping sleeve 17'. This aperture 20 is also located in the center of the clamping sleeve 17'. As a result thereof, the clamping sleeve 17' cannot move axially relative to the support sleeve 8, but is able to rotate relative thereto. The clamping sleeve 17' is also constructed of tubular shape and surrounds with its flanges 18 the part 16a of the wire frame 16 of the sun visor plate 3. An additional clamp 21 is provided at the clamping sleeve 17' within the area thereof corresponding to the section 8a of the support sleeve 8 which can be tightened more or less by an adjusting screw 19 (only schematically illustrated). In this manner, the friction, on the one hand, between the clamping ring 17 and the support sleeve 8 and, on the other, between the segmental bodies 13 of the latter, and the flattened surfaces 14a of the support rod, can be changed. The adjustment is thereby selected that the sun visor plate 3 stays fixed automatically in every desired position.

A handle 24 is provided in proximity to the free end 22 of the sun visor plate 3. The sun visor plate 3 can be pivoted and axially displaced on the support rod 6 in the manner described above. The area in which a sun visor effect takes place on the driver or passenger side is enlarged in this manner.

While I have shown and described only one embodiment in accordance with the present invention, it is understood that the same is not limited thereto but is susceptible of numerous changes and modifications as known to a person skilled in the art, and I therefore do not wish to be limited to the details shown and described herein which can be varied at will within the scope of those skilled in the art.

I claim:

1. A sun visor, especially at the windshield of motor vehicles, whose sun visor plate is pivotally arranged on an approximately horizontally extending support rod, which in its turn, is pivotal at one end about an approximately vertical axis, wherein the improvement comprises means simultaneously enabling displacement of said sun visor plate on the support rod in the axial direction thereof, said means being operable to automatically fix said sun visor plate on said support rod in every desired axial position by clamping action and including at least one non-rotatably guided support sleeve means axially displaceable on said support rod, and clamping means for mounting said sun visor plate on said support sleeve means, wherein the support sleeve means is provided with a longitudinal slot within the area of segmental body means secured in said support sleeve means for the adjustment of the clamping action, and said clamping means being provided with additional clamp means adjacent an aperture on the part of the support sleeve means corresponding to the portion thereof which is slotted, and adjusting means for adjusting the clamping action of said additional clamp means.

2. A sun visor according to claim 1, wherein the support sleeve means is provided approximately in its center wtih a projecting fold for the engagement in said corresponding aperture provided in the clamping means.

3. A sun visor according to claim 2, wherein said support rod is flattened off on two sides, and said segmental body means secured in the support sleeve means which correspond to the flattened surfaces of the support rod.

4. A sun visor, especially at the windshield of motor vehicles, whose sun visor plate is pivotally arranged on an approximately horizontally extending support rod, which in its turn, is pivotal at one end about an approximately vertical axis, and means simultaneously enabling displacement of said sun visor plate on the support rod in the axial direction thereof, wherein said means includes at least one non-rotatably guided support sleeve means axially displaceable on said support rod, and clamping means for mounting said sun visor plate on said support sleeve means, and wherein the support sleeve means is provided with a longitudinal slot within the area of segmental body means secured in said support sleeve means for the adjustment of the clamping action and said clamping means being provided with additional clamp means adjacent an aperture on the part of the support sleeve means corresponding to that portion thereof which is slotted, and adjusting means for adjusting the clamping action of said additional clamp means.

5. A sun visor according to claim 4, wherein the support sleeve means is provided approximately in its center with a projecting fold for the engagement in a said corresponding aperture provided in the clamping means.

6. A sun visor according to claim 4, wherein said support rod is flattened off on two sides, and said segmental body means secured in the support sleeve means which correspond to the flattened surfaces of the support rod.

References Cited

UNITED STATES PATENTS

| | | | |
|---|---|---|---|
| 2,201,348 | 5/1940 | Roberts | 296—97 |
| 2,360,183 | 10/1944 | Westrope | 296—97 |
| 2,462,304 | 2/1949 | Burdick | 296—97 |

LEO FRIAGLIA, Primary Examiner

J. A. PEKAR, Assistant Examiner

U.S. Cl. X.R.

248—279; 287—3